United States Patent [19]

Paradine

[11] Patent Number: 5,739,822
[45] Date of Patent: Apr. 14, 1998

[54] DATA PROCESSING SYSTEM FOR SURFACING A MODEL

[75] Inventor: Christopher Paradine, Southampton, United Kingdom

[73] Assignee: International Business Machines Corporation, Armonk, N.Y.

[21] Appl. No.: 502,222

[22] Filed: Jul. 13, 1995

[30] Foreign Application Priority Data

Jul. 27, 1994 [GB] United Kingdom .................. 9415102

[51] Int. Cl.⁶ .................................................. G06F 3/14
[52] U.S. Cl. ........................... 345/419; 345/420; 345/429
[58] Field of Search ........................ 395/119, 129, 395/120, 121, 123; 382/256, 257, 258, 259

[56] References Cited

U.S. PATENT DOCUMENTS

| | | | |
|---|---|---|---|
| 4,845,651 | 7/1989 | Aizawa et al. | 364/522 |
| 4,888,713 | 12/1989 | Falk | 364/522 |
| 5,214,752 | 5/1993 | Meshkat et al. | 395/123 |

*Primary Examiner*—Heather R. Herndon
*Assistant Examiner*—Sabrina Dickens

*Attorney, Agent, or Firm*—Gerald R. Woods

[57] ABSTRACT

The present invention provides a data processing system, and method of operation of such a system, for creating a surface on a model of a 3D object, the model being stored as data in a storage device. The system comprises input means (10) for enabling a user to define lines representing features of the object, the lines being stored as model data in the storage device (40), and means (30, 50) to generate and display an image representing the model from the model data. Further the system is characterised by: identification means (60) for identifying data representing a plurality of the lines that form a first closed loop consisting of edges meeting at nodes, and for retrieving such data from the storage device (40); and processing means (20) for generating data defining a series of additional loops to represent a candidate surface bound by the first closed loop. Additionally the processing means (20) is adapted to receive data representing a line defined by the user via the input means which subdivides the first closed loop into a plurality of new closed loops, and then to edit the candidate surface by generating a further series of additional loops for each such new closed loop. This technique allows a designer to quickly create a model of an object and have a surface created for the model, and then provides the designer with a quick and intuitive technique for editing such surfaces.

5 Claims, 5 Drawing Sheets

DATA PROCESSING SYSTEM FOR SURFACING A MODEL

FIELD OF THE INVENTION

The present invention relates generally to techniques for surfacing models represented by wire frame loops, and in particular to a data processing system and method for creating a surface for a model of an object, such a model being created within a 3D space defined by the system.

BACKGROUND OF THE INVENTION

Currently models of objects can be created using a class of systems referred to as computer aided design (CAD) systems. These CAD systems allow precise models of objects to be created within the system, from which technical drawings, scaled models, templates, etc. can be created. Such CAD systems are becoming commonplace, and are used in many business areas, e.g. car design, architecture, etc., to assist designers in the design of new products.

However CAD systems are not really suitable for the initial stages of design when the designer has various ideas in his/her head. A designer who has thought of an idea for a new product will want to get that idea down in some tangible form while it is still clear in his/her mind. Typically the designer will make a quick sketch on a piece of paper, which will show the basic outline and an indication of the desired surface for that product. Being used to pen and paper, a designer will generally find it the most convenient form in which to experiment with the design ideas. At this stage of the design process, the designer is not particularly interested in achieving absolute precision, but is instead attempting to illustrate the general design features, and get a feel of how the object will look.

Sketched drawings do, however, have their disadvantages. The major disadvantage is that a sketch will only show the object from one particular direction. Several sketches will need to be produced to show the full shape of the object. Further, sketched drawings are not very adaptable. While lines can be erased and redrawn, it is not possible to shift the viewing angle by a small amount. If such a view is required, another sketch must be made.

Despite this disadvantage, sketches do have the advantage that the designer is able to make a note of his design idea quickly without having his/her thought process distracted. For this reason, a designer would be unlikely to work with a CAD system during this early stage of design, since such a system would not allow the designer to enter rough sketches quickly. Typically such CAD systems might require that the designer draw each line from two orthogonal viewpoints, which would disrupt the general thought process. Further, such prior art systems do not allow surfaces to be readily created.

The two most common techniques for creating surfaces involve either generating a master curve and performing an operation on it (such as rotating or extruding), or creating a patch (that often has to be quadrilateral) and then shaping the surface by moving control points that lie close to, and influence the shape of, the surface.

The problem with these approaches are that they are not likely to be intuitive to an artistic and stylistic oriented user, and so hinder a designer who wishes to quickly store his idea in some tangible form. In general, current development in this area has produced more and more complex spline formulations, such as splines with n-sided patches. These more complex techniques have, however, generally not yet made the leap from research projects to acceptance by the industry.

What many designers need is an analogue to the manual drawing process, but with the automatic provision of a candidate surface; further, if the generated surface does not satisfy the designer's requirements, the designer should readily be able to modify the surface.

It is hence an object of the present invention to provide a system in which the designer is able to quickly enter his ideas in a convenient form, such that the general outline including a surface can then be reviewed and/or modified.

SUMMARY OF THE INVENTION

Accordingly the present invention provides a data processing system for creating a surface on a model of a 3D object, the model being stored as data in a storage device, and the system comprising: input means for enabling a user to define lines representing features of the object, the lines being stored as model data in the storage device; means to generate and display an image representing the model from the model data; the system being characterized by: identification means for identifying data representing a plurality of the lines that form a first closed loop consisting of edges meeting at nodes and for retrieving such data from the storage device; processing means for generating data defining a series of additional loops to represent a candidate surface bound by the first closed loop; the processing means being adapted to receive data representing a line defined by the user via the input means which subdivides the first closed loop into a plurality of new closed loops, and then to edit the candidate surface by generating a further series of additional loops for each such new closed loop.

Typically the series of additional loops created by the processing means converge, the data for each loop in the series being generated from the data representing the nodes and the edge shape of the directly previously formed loop.

In preferred embodiments the processing means further comprises: calculation means for determining, for each additional loop in the series, the nodes of that loop by a 3D calculation from the corresponding node of the directly adjacent loop; and mapping means for generating the edges of each additional loop by mapping the corresponding edge of the directly adjacent loop between the nodes calculated by the calculation means.

The mapping means can employ any of a number of different mapping techniques to produce an edge between the nodes calculated by the calculation means. However in preferred embodiments the mapping means generates the edges of each additional loop by translating and scaling a sub-section of the corresponding edge of the directly adjacent loop to fit between the nodes calculated by the calculation means. This approach has the advantage that, if the sub-section's length approximately matches the target length between the two new nodes, the shape of the edges of the outer closed loop are propagated. This is often the desired result, for instance where a feature such as a bend or ridge in one edge of the loop is intended to extend across the surface to the opposite edge of the loop.

In preferred embodiments the identification means is activated each time a new line is defined by the user, and applies a topological search routine to follow paths through the model data representing connected lines to determine whether any such paths lead back to the data representing the newly entered line, thereby indicating the presence of a closed loop. If desired provision can also be made for the user to identify closed loops manually via the input means.

Viewed from a second aspect the present invention provides a method of operating a data processing system to create a surface on a model of a 3D object, the model being stored as data in a storage device, and the method comprising the steps of: enabling a user, via an input means, to define lines representing features of the object, the lines being stored as model data in the storage device; generating and displaying an image representing the model from the model data; the method being characterised by the steps of: employing an identification means to identify data representing a plurality of the lines that form a first closed loop consisting of edges meeting at nodes; retrieving such data from the storage device; employing a processing means to generate data defining a series of additional loops to represent a candidate surface bound by the first closed loop; providing the processing means with data representing a line defined by the user via the input means which subdivides the first closed loop into a plurality of new closed loops; and editing the candidate surface by employing the processor means to generate a further series of additional loops for each such new closed loop.

BRIEF DESCRIPTION OF THE DRAWINGS

The present invention will be described further, by way of example only, with reference to an embodiment thereof as illustrated in the accompanying drawings, in which.

DESCRIPTION OF THE PREFERRED EMBODIMENT

Figure 1:
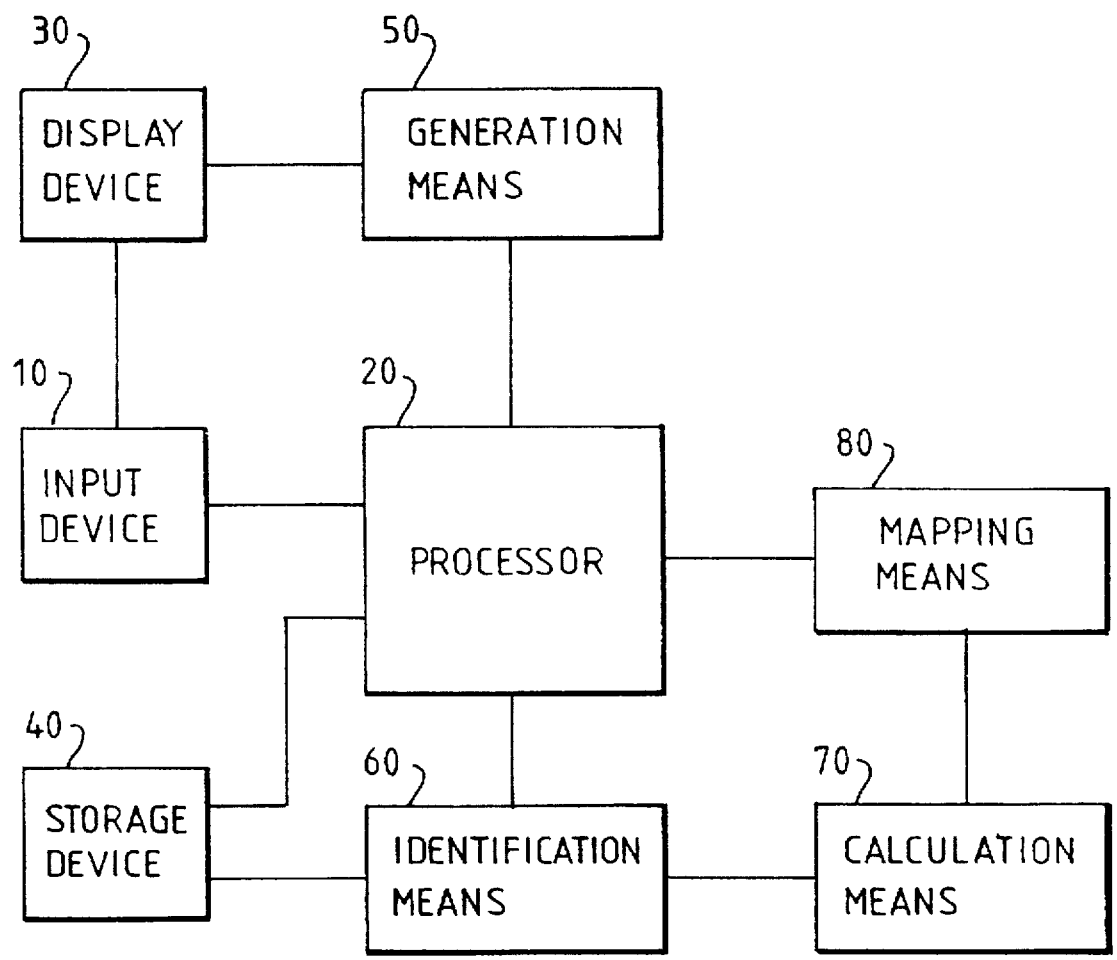
FIG. 1 is a block diagram of a data processing system in accordance with a preferred embodiment of the present invention.

As outlined above, the problem to be solved by the present invention is that of putting surfaces across arbitrarily-shaped wire-frame loops, and it is dominated by the need to be fast enough to allow the design process to remain interactive. Plausible, though not perfect, surfaces are required together with an easy and intuitive method of editing such surfaces to enable the user to 'draw' the shape that is in his/her mind's eye.

It has been found that, generally speaking, any surface on a loop is instantaneously constrained at each of the nodes of the loop to lie in the plane formed by the junctions of the loop edges. In contrast, the directional behaviour of an edge between the nodes has very little bearing on the surface normal. This can be understood by considering the example in FIG. 2, in which two semi-circles of wire 300, 310 meet at opposite ends 330, 340 of a diameter where there are assumed to be 'hinged' junctions. If the semi-circle 300 is considered to be lying in a horizontal plane, then the other semi-circle 310 can be seen to stand 'upright' in a roughly vertical plane. A plausible surface, roughly a quarter of a sphere, is shown. This surface passes tangentially through the planes defined at the two junctions, while it is perpendicular to the two planes defined by the semi-circular loops themselves.

However, if the upright semi-circle is folded flat down onto the horizontal plane so that the loop becomes a complete circle, the most plausible surface is now clearly the horizontal plane itself. This surface is still tangential to the planes at the junctions, but it is now also tangential to the planes defined by the curve of the semi-circles, not perpendicular to them.

If one moves the hinged semi-circle 310 progressively back up to its original position perpendicular to the horizontal plane then the most likely surface changes gradually from a flat circle to a quarter sphere and during that transition, although the surface always remains tangential to the planes defined at the two junctions 330, 340, the angle that the surface makes with the curve of the loops 300, 310 goes through every value between parallel and perpendicular to the plane of the curves. Hence it is apparent that little or no information about the surface normal can be deduced from edge curvature.

So a surface needs to be constructed whose direction is constrained only at the junctions, but which correctly follows the edge shapes in between.

Figure 2:
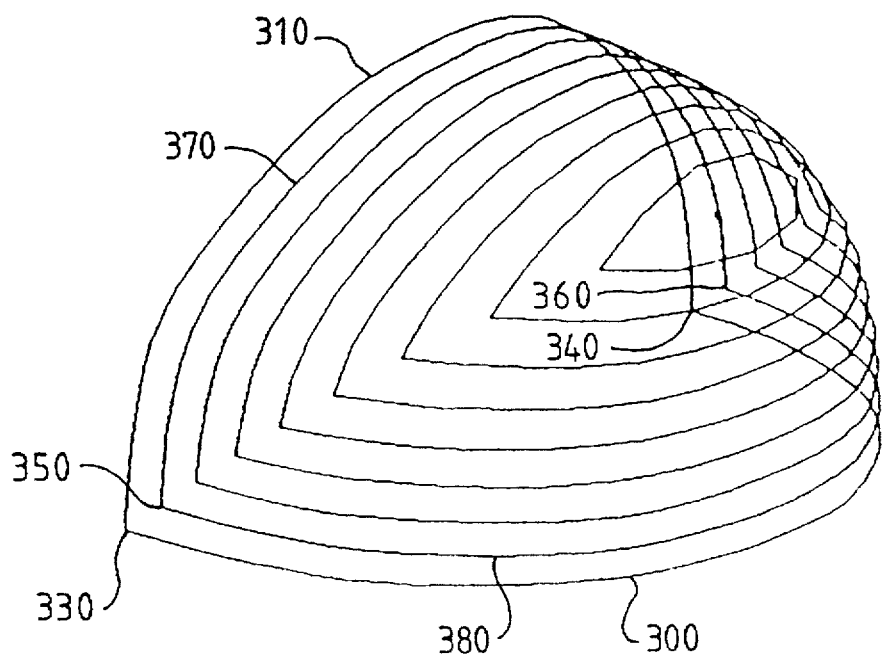
FIGS. 2 and 3 are illustrations of surface representations produced by the system of the preferred embodiment.

FIG. 2 gives a general illustration of how the system of the preferred embodiment overcomes this problem. The closed loop formed by the two semi-circles 300, 310 is 'grown' simultaneously inward from each of the loop's nodes 330, 340. As will be explained in more detail later, this is done by calculating new node points 350, 360 from the original nodes 330, 340, and then mapping the shape of the edges 300, 310 between these new node points to produce a new loop 370, 380 roughly similar in shape to the original, with its sides parallel, but smaller and in a sense 'concentric' with the original.

This process is repeated successively, each new loop acting as the basis for the calculation of the next loop, until the successive loops created reach zero size at the 'centre', at which point the mapping process is complete.

The surfacing technique outlined above will now be described in more detail with reference to FIG. 1, which illustrates the essential elements of the data processing system of the preferred embodiment. The user of the system interacts with the system by means of an input device 10 which enables the user to enter hand-drawn lines. Several such devices exist for drawing on a computer screen, for example magnetic tablets, resistive and capacitive overlays, laser scanners, 3D trackers, etc. These all allow a user to line-draw a 2D or 3D representation of an object. In preferred embodiments, the user has a tracked stylus with which he/she draws a model of the object directly on the surface of a thin, flat screen. The user can then, for example, use a mouse to rotate the model.

Although the precise way in which 2D sketched lines may be interpreted in three dimensions is not the subject of the present invention, a suitable technique is described in EP-A-0,594,337. That patent application describes a technique in which an ambiguous 2D line entered by the user to represent a feature of the object is processed to produce a number of unambiguous candidate lines in 3D space, one such line being selected as the representation to be added to the model.

Returning to FIG. 1, the user employs the input device 10 to enter lines representing features of the object to be modelled by the system. The input data from the entry device 10 passes to a processor 20, which stores the data in the storage device 40 and sends data to the output generation means 50. The output generation means 50 generates display drive signals for a display device 30 so as to cause the display device 30 to display the lines entered by the user.

As the lines are entered by the user, closed loops will tend to be defined. An identification means 60 is provided within the system to identify data in the storage device 40 representing a closed loop. This identification means 60 may be designed to operate in any suitable manner. In the preferred embodiment a topological search routine is employed. This is basically an iterative process activated each time a new line is entered by the user via input device 10. The data representing any line which contacts the new line is located, and then it is determined whether any of these lines are contacted by any other lines. If they are, the data for those lines is located, and again it is determined whether any of those lines are contacted by any other lines. By repeating this process any closed loop formed upon entering the new line will be identified, since the relevant iteration of the above process will follow all the lines making up the loop until it comes back to the new line.

Figure 4:
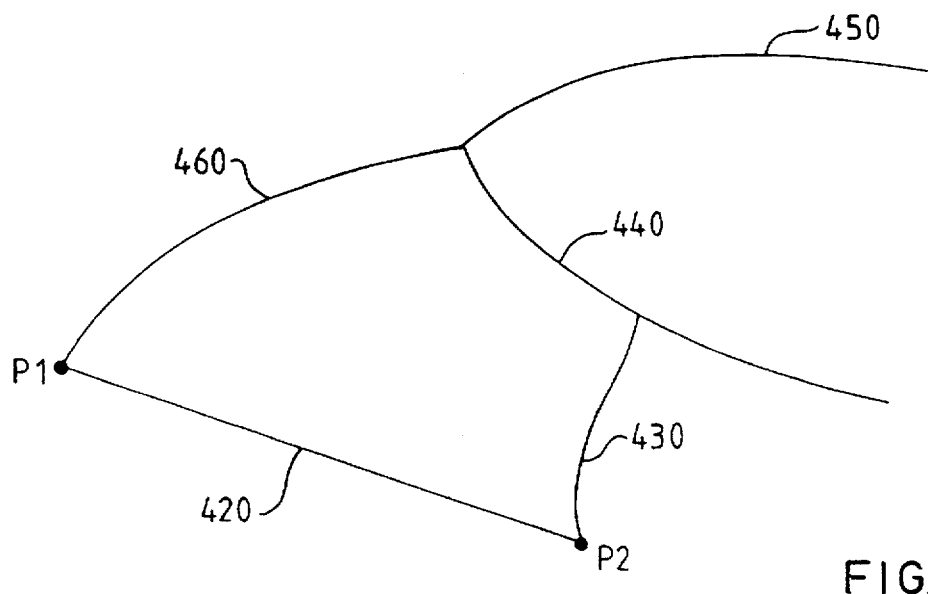
FIG. 4 illustrates the operation of the identification means of the system of the preferred embodiment.

To illustrate this topological search process consider the line drawing in FIG. 4. Lines 430, 440, 450 and 460 have been entered by the user via input device 10 and are represented as 3D model data in the storage device 40. When the user enters the line 420, this forms a closed loop with lines 430, 440 and 460. The identification means 60 identifies this closed loop in the following manner. Firstly the iterative process is triggered by the entry of line 420. By studying the model data in the storage device 40 it is determined that lines 430 and 460 have data points in common with the new line 420, i.e. points P1 and P2 respectively, and hence must meet line 420. Considering solely the line 430 for the moment the search routine will apply the same process to this line to identify that line 440 touches line 430. Similarly lines 450 and 460 will then be identified as touching line 440, and line 460 will be identified as touching the new line 420. At this stage the routine will note that a complete loop has been identified.

In the system of the preferred embodiment, the above described topological search can be selectively activated and de-activated, and the user can additionally manually select a particular loop for subsequent surfacing. This selection can be made via a keyboard, mouse, or other suitable input device.

Once the identification means 60 has identified data representing a closed loop, it retrieves that data from the storage device 40 and passes it to a calculation means 70. Since the loop is formed by a sequence of lines, the edges of the loop will be formed by the lines themselves, and nodes will exist where the lines meet.

Hence the closed loop has n edges meeting at n nodes. As discussed earlier, any plausible surface must coincide instantaneously with the planes defined at each of the nodes. It must also pass through the edges and therefore mimic their arbitrary 3D shape. In the preferred embodiment the surface is indicated by a series of additional loops which will typically converge towards a point; see for example FIG. 2 already discussed. The calculation means is used to calculate the nodes for each of these additional loops.

In the preferred embodiment the calculation means 70 is a software routine that calculates the nodes for each additional loop in the series. It does this by performing a 3D calculation on the nodes of the immediately preceding loop, whether that be the original closed loop or one of the additional loops. For instance, if there are three additional loops in the series, the nodes for the first loop are derived from the nodes of the original closed loop, the nodes for the second loop are formed from the nodes of the first loop, and the nodes for the third loop are formed from the nodes of the second loop.

The 3D calculation can be carried out in a number of ways. The technique employed in the preferred embodiment of the present invention is described with reference to FIG. 5. Consider the node N formed by the junction of lines 510 and 520. The first additional loop in the series used to represent the surface will have a corresponding node N'. The position of the node N' is found by constructing a '3D parallelogram' at the node N, the parallelogram being '3D' in the sense that its sides are comprised of three dimensional lines. The other three vertices of the parallelogram are calculated as follows.

From a preset value defining a percentage of the overall edge length of the initial closed loop, which in the preferred embodiment is user selectable, the edge lengths delta1 and delta2 are calculated; for example if the preset value is 5, delta1 will be 5% of the length of line 520, and delta2 will be 5% of the length of line 510. Further the edges' delta1 and delta2 follow the curvature of their respective lines 520, 510, and so track out a curve in 3D space. Once delta1 and delta2 have been calculated the interpolated points P1 and P2 are determined as the points on the two edges 520 and 510 at delta1 and delta2 from the node N respectively.

Then the 3D displacement P1-N is added to P2 to determine the opposite vertex of the parallelogram, this vertex being the location of the node N'. This process is then repeated for every other node in the loop.

Figure 6:
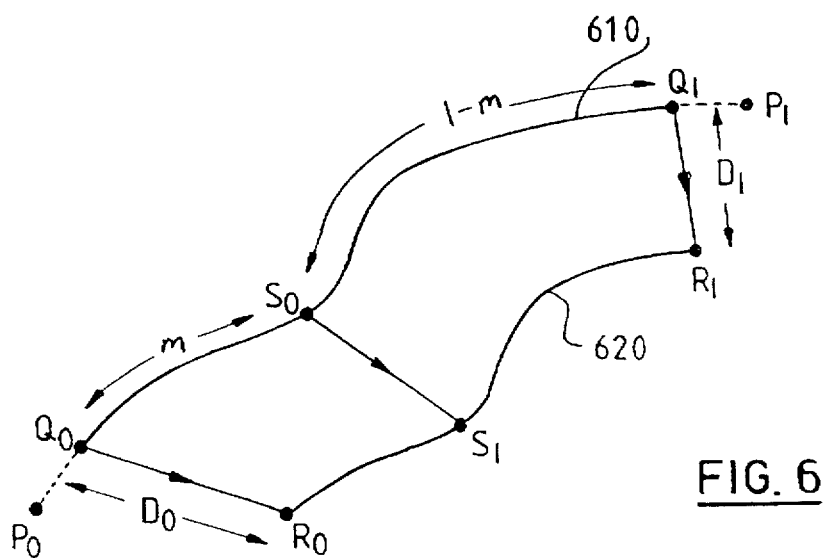
FIG. 6 illustrates the operation of the mapping means of the system of the preferred embodiment.

As an alternative to the above technique a 3D triangle can be formed at the node N, as illustrated in FIG. 6. In this case the interpolated points P1 and P2 are calculated as the points on the two edges 520 and 510 at displacements of twice delta1 and twice delta2 from the node N. Node N' is then determined as the midpoint of an imaginary line passing between P1 and P2.

Figure 5A:
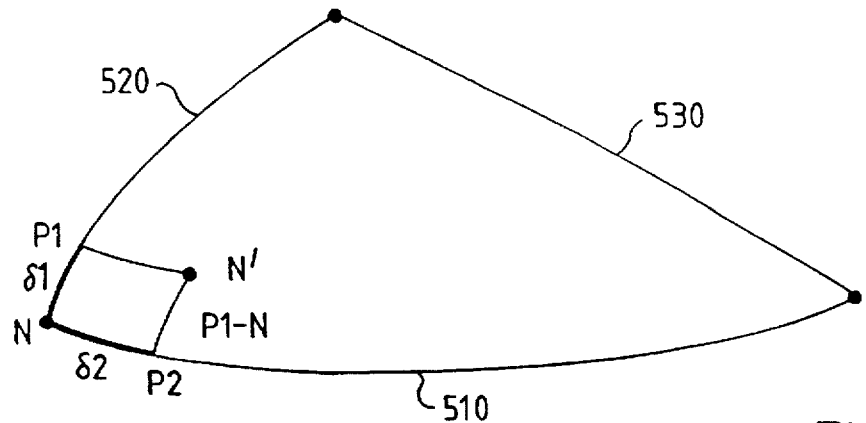
FIGS. 5A and 5B illustrate two techniques by which the calculation means of the system of the preferred embodiment can calculate nodes for the additional loops used to represent the surface.
Figure 5B:
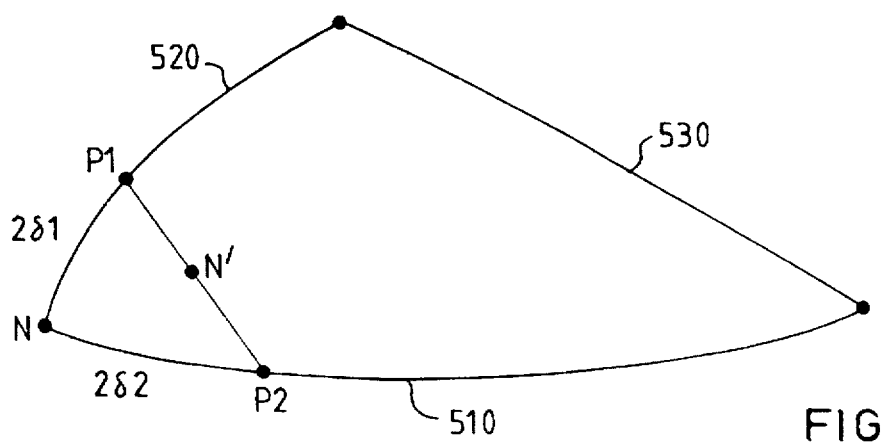

In the preferred embodiment of the invention, the delta values remain the same for each successive loop in the series, i.e. in FIGS. 5 and 6, delta1 will be 5% of the length of line 520 and delta2 will be 5% of the length of line 510 for every loop in the series. This ensures that a generally equal spacing exists between all the loops making up the series. However, it is possible to calculate deltas for each successive loop based on the edge length of the immediately preceding loop, this having the characteristic that the loops get closer together as the center is approached, i.e. the center of the surface is represented at a higher granularity than the outer region.

Both the parallelogram and triangle techniques adequately take account of mild curvature. If curvature is severe, then a finer grid of surfacing lines can be used by reducing the preset values used to calculate delta1 and delta2.

Once all of the nodes for an additional loop have been calculated a mapping means 80 is activated to map the edges of the previous loop to span between the nodes calculated by the calculation means 70. For example, considering FIG. 2, the edge 310 will be mapped between the nodes 350, 360 to form the new edge 370. In the preferred embodiment a subsection of the edge (the original edge minus approximately the deltas used up in the parallelograms) is mapped down to span the two corresponding inner nodes so that the general shape of the edge is propagated.

Figure 7:
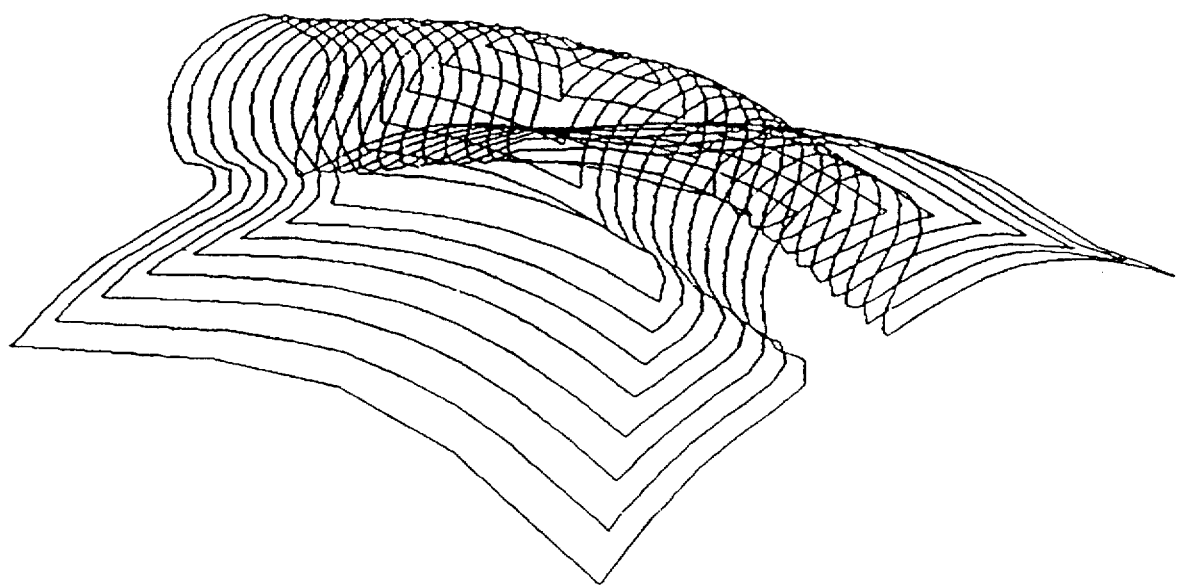
FIG. 7 is an illustration of a surface representation produced by the system of the preferred embodiment.

The mapping means, provided by a software routine in the preferred embodiment of the present invention, is illustrated further with reference to FIG. 7. In this figure a loop edge extending between two nodes $P_0$ and $P_1$ of the loop is shown. By removing the deltas from each end of this loop edge, a reduced edge 610 is formed extending between points $Q_0$ and $Q_1$. The calculation means 70 has been used to derive new loop nodes $R_0$ and $R_1$ for the next loop in the series from the two nodes $P_0$ and $P_1$.

The mapping means 80 operates by translating and scaling the edge 610 so that it spans between the nodes $R_0$ and $R_1$ to form edge 620. For each data point $S_0$ representing the edge 610, this is done as follows. If $S_0$ is a fraction 'm' of the way along the edge 610 from the point $Q_0$, then its equivalent point $S_1$ on edge 620 should be a fraction 'm' of the way along the edge 620 from the point $R_0$.

The vector $\underline{S_0 S_1}$ is then calculated as "$(1-m).\underline{D_0}+m.\underline{D_1}$". For instance when m=0 this equation gives $\underline{S_0 S_1}=D_0$, and when m=1 the same equation gives $\underline{S_0 S_1}=D1$. This equation then gives rise to the following vector equation:

$$\underline{S_1}=\underline{S_0}+(1-m).\underline{D_0}+m.\underline{D_1}$$

Figure 8:
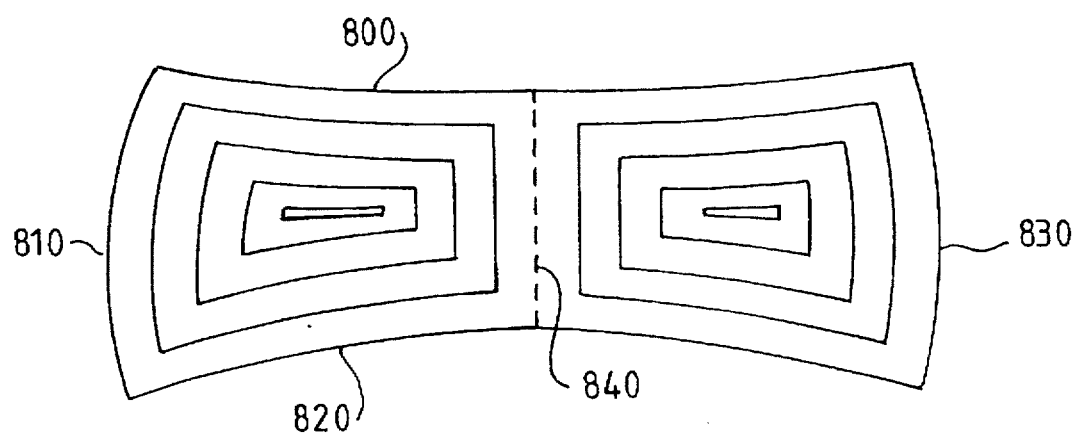
FIG. 8 illustrates how extra lines can be defined by the user to assist in the surfacing of some loops.

The above described mapping approach preserves the essential shape of the loop. If the whole edge were mapped on to the normally shorter distance between the new inner nodes, then features on the edge would quickly get smaller, disappearing at the centre of the surface. Although this is possibly the correct behaviour for features that exist in isolation on one edge (singularities), the more common situation is that the feature represents a bend or ridge that extends across the surface to another edge—a cylindrical patch is a common case. For this reason the mapping algorithm takes instead a sub-section of the original edge whose length is nearer to matching the target length, and inner features thereby tend to have their size preserved. This is illustrated in FIG. 8 wherein the tubular bulge retains its size across the width of the loop.

The above-described system produces plausible surfaces for simple, and some not-so-simple (see for example FIG. 8 mentioned earlier) loops. Such an automatic surface may not be exactly the surface the designer requires, but it provides him/her with a basis for modification. An important feature of the system of the preferred embodiment is that it can handle 'formlines', where a formline is a line in the model which has been constructed by the user not to show an edge but rather to indicate to the system the desired shape of a surface, i.e. lines across which the surface is continuous. The designer can draw 'formlines' on the existing surface, dividing the original loop, and can then modify the formlines by, for example, partial redraw, pulling, etc. Further the system can discard the original surface, and create new surfaces from the two 'halves' using the technique already described above.

Figure 3:
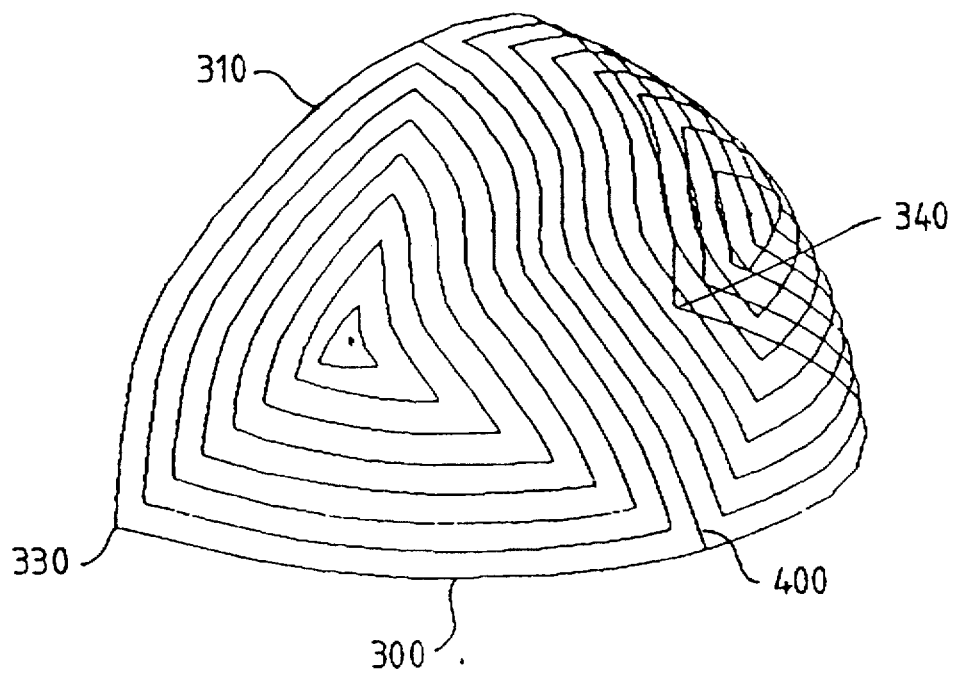

The system of the preferred embodiment does not distinguish between formlines and any other lines entered by the user; as far as the system is concerned a formline dividing a loop just has the result that two loops now exist in place of the original one. The surfacing technique described earlier has the advantage that the composite surface will not only go through the new formline but will be continuous across it within the granularity of the process. This is illustrated in FIG. 3 where a formline 400 has been added to the loop of FIG. 2, in effect creating two smaller loops. The surfacing technique results in a continuous surface passing through the formline. Decreasing the preset value used by the calculation means 70 to calculate the delta values generally increases the number of loops in the series used to represent the surface, and improves the continuity across the formline.

The above approach provides an intuitive mechanism for correcting surfaces. The formlines do not have to be drawn on existing surfaces, they can be created from scratch. However the simple continuity described requires that formlines should not cross each other topologically and that they should meet the original loop where its differential is continuous (i.e. not at a junction or at a violent kink) otherwise this discontinuity will appear as a new edge.

Once the system of the preferred embodiment has created the surface representation required by the user then, as will be apparent to a person skilled in the art, the resulting wire loop representation of the surface can be triangulated and rendered as a surface using any of a number of known techniques.

There are some situations which may not be handled in the intended manner by the surfacing technique described above, namely:

1. With the system of the preferred embodiment, the surface is grown 'inward' from a node. If the loop exhibits a reflex angle at a node then 'inward' becomes 'outward' with respect to the angle between the edges.
2. If a loop is long and thin, or if its sides have concavities, then the grown lines may meet or overlap their opposite sides before the process has terminated at a neat center.
3. If the loop has many edges making obtuse angles, then the process may complete leaving an overlarge planar polygon in the middle.

The above three problems can be alleviated by the designer including some appropriate formlines to provide more information about the desired surface shape. For example, with regard to item 2 above, consider FIG. 9. If the loop formed by the lines 800, 810, 820, 830 is surfaced using the above-described technique, the loops used to represent the surface will tend to overlap in the middle. However if a formline 840 is added by the user, the surface representation is produced without any overlapping.

In summary there is no fool-proof way of detecting such problem loops, as the plausibility of their surfaces is subjective. However the system of the preferred embodiment has the advantage that the same mechanism that permits easy editing of surfaces can also be used to mitigate such problems. A couple of judicious formlines will usually resolve the user's intentions.

While there has been described what is considered to be a preferred embodiment of the present invention, variations and modifications thereto will occur to those skilled in the art once they become aware of the inventive concepts. Therefore, it is intended that the appended claims shall be construed to include both the preferred embodiment and all such variations and modifications as fall within the true spirit and scope of the invention.

What is claimed is:

1. In a data processing system for creating a model of a 3D object, the model being stored as 3D topology data in a storage device, and the system including input means (10) for enabling a user to define lines representing features of the object, the lines being stored as model data in the storage device (40), and means (30, 50) to generate and display an image representing the model from the model data, a surface generating system comprising:

identification means (60) for identifying stored data representing a plurality of the lines on the model that form a first closed loop consisting of edges meeting at nodes and for retrieving such data from the storage device (40); and processing means (20) for generating data defining a convergent series of additional loops to represent a candidate surface bound by the first closed loop, the data for each additional loop in the series being automatically generated from the data representing the nodes and the edge shape of the directly adjacent loop, said processing means further comprising, for automatically generating the data for each additional loop, calculation means for generating the edges of that additional loop by a 3D calculation from the corresponding node of the directly adjacent loop and mapping means for generating the edges of that additional loop by translating and scaling a sub-section of the corresponding edge of the directly adjacent loop to fit between the calculated nodes;

the processing means (20) being adapted to receive data representing a line defined by the user via the input means which subdivides the first closed loop into a plurality of new closed loops, and then to edit the candidate surface by generating a further series of additional loops for each such new closed loop.

2. A surface generating system as claimed in any of claim 1 wherein the identification means is activated each time a new line is defined by the user, and applies a topological search routine to follow paths through the model data representing connected lines to determine whether any such paths lead back to the data representing the newly entered line, thereby indicating the presence of a closed loop.

3. A surface generating system as claimed in claim 2, wherein the user can also identify closed loops manually via the input means 10.

4. A method of operating a data processing system to create a surface on a model of a 3D object, the model being stored as 3D topology data in a storage device, and system having the capability of allowing a user to define, via an input means (10), lines representing features of the object, the lines being stored as model data in the storage device (40), and to generate and display an image representing the model from the model data, the method being characterized by the steps of:

employing an identification means (60) to identify data representing a plurality of the lines that form a first closed loop consisting of edges meeting at nodes;

retrieving such data from the storage device (40);

employing a processing means (20) to generate data defining a convergent series of additional loops to represent a candidate surface bound by the first closed loop, the data for each additional loop in the series being automatically generated from the data representing the nodes and the edge shape of the directly adjacent loop by the additional steps of determining the nodes of the additional loop by a 3D calculation from the corresponding node of the directly adjacent loop and generating the edges of the additional loop by translating and scaling a sub-section of the corresponding edge of the directly adjacent loop to fit between the calculated nodes;

providing the processing means (20) with data representing a line defined by the user via the input means which subdivides the first closed loop into a plurality of new closed loops; and editing the candidate surface by employing the processor means (20) to generate a further series of additional loops for each such new closed loop.

5. A method as claimed in any of claim 4 wherein the step of employing an identification means occurs each time a new line is defined by the user, and comprises the step of applying a topological search routine to follow paths through the model data representing connected lines to determine whether any such paths lead back to the data representing the newly entered line, thereby indicating the presence of a closed loop.

* * * * *